United States Patent [19]

Yamamori et al.

[11] 4,225,026
[45] Sep. 30, 1980

[54] CLUTCH MECHANISM FOR AUTOMATIC POWER TRANSMISSION

[75] Inventors: Takahiro Yamamori, Tokyo; Kazuyoshi Iwanaga; Kunio Ohtsuka, both of Yokohama, all of Japan

[73] Assignee: Nissan Motor Company, Limited, Yokohama, Japan

[21] Appl. No.: 956,132

[22] Filed: Oct. 30, 1978

[30] Foreign Application Priority Data

Sep. 18, 1978 [JP] Japan .................... 53-114938

[51] Int. Cl.³ .................................. F16D 25/063
[52] U.S. Cl. .................... 192/70.2; 192/85 AA
[58] Field of Search .......... 192/85 AA, 48.5, 70.2, 192/107 R, 87.13, 87.15; 188/71.5, 73.1, 218 XL

[56] References Cited

U.S. PATENT DOCUMENTS

| | | | |
|---|---|---|---|
| 2,519,865 | 8/1950 | Wellman | 188/218 XL X |
| 2,925,897 | 2/1960 | Snyder | 192/70.2 |
| 3,308,686 | 3/1967 | Magg et al. | 192/85 AA X |
| 4,010,831 | 3/1977 | Reuter | 188/218 XL X |
| 4,014,619 | 3/1977 | Good | 192/70.2 X |
| 4,082,171 | 4/1978 | Lalin et al. | 188/71.5 X |

*Primary Examiner*—Rodney H. Bonck
*Attorney, Agent, or Firm*—Thompson, Birch, Gauthier & Samuels

[57] ABSTRACT

Grooves formed in a cylindrical member of the high-and-reverse clutch are designed to receive therein detents or teeth of clutch plates respectively and each of openings formed in a drum member of forward drive clutch is designed to receive therein at least two adjacent teeth of each clutch plate so that these high-and-reverse and forward drive clutches can use common clutch plates.

6 Claims, 8 Drawing Figures

CLUTCH MECHANISM FOR AUTOMATIC POWER TRANSMISSION

FIELD OF THE INVENTION

The present invention relates in general to an automotive automatic power transmission, more particularly to a clutch mechanism of the transmission which functions to selectively engage and disengage a driving and a driven element of the transmission. More specifically, the present invention is concerned with improvement in constructions of the clutch drums and the corresponding clutch plates employed in the high-and-reverse and forward drive clutches of the transmission.

BACKGROUND OF THE INVENTION

It is known in the art to use steel plates as a material for the clutch drums of the high-and-reverse and forward drive clutches for achieving reduction of cost. The thickness of the plate for the clutch drums is determined corresponding to the external force applied to such drums under operation of the transmission. Usually, the clutch drum for the high-and-reverse clutch is constructed of relatively thick steel plate in comparison with that for the forward drive clutch since the clutch drum of the high-and-reverse clutch should tolerate not only the force applied thereto by a brake band wrapping the same but also the force generated by pressurized fluid in a piston chamber defined therein. However, from the mechanical point of view, it is usual to design and construct the high-and-reverse clutch such that the clutch plates thereof are splined to grooves formed on a separate cylindrical member of steel plate which is coaxially held in the clutch drum, while the forward drive clutch is such designed that the clutch plates thereof are splined to openings formed in the clutch drum thereof. The grooves of the separate cylindrical member of the high-and-reverse clutch are formed by press forming so that each groove is shaped to have a trapezoidal cross section (see FIG. 3) by the nature of the press forming technique. This induces a necessity of shaping detents or teeth of the clutch plates into a trapezoidal form for achieving effective spline connection between the clutch plates and the cylindrical member of the high-and-reverse clutch. On the other hand, the openings of the clutch drum of the forward drive clutch are formed by punching, so that two facing shared surfaces of each opening are left paralleled, inevitably. As is known in the art, effective spline connection is not expected from the engagement between the trapezoidal teeth and the opening having such parallelly shared surfaces. Thus, the high-and-reverse clutch and the forward drive clutch of the type mentioned above cannot use common clutch plates, inducing difficulty in increasing productivity of the clutches and thus difficulty in reducing cost of the transmission.

OBJECTS OF THE INVENTION

It is therefore an object of the present invention to provide an automatic power transmission which features low cost and high productivity.

It is another object of the present invention to provide an automatic power transmission in which the high-and-reverse clutch and the forward drive clutch are designed to use common clutch plates.

SUMMARY OF THE DRAWINGS

Other objects and advantages of the present invention will become clear from the following description when taken in conjunction with the accompanying drawings, in which.

DESCRIPTION OF THE EMBODIMENT

Prior to describing the detailed construction of the clutch mechanism according to the invention, explanation of overall construction of the transmission in which the clutch mechanism of the invention is employed will be made with reference to FIG. 1 in order to clarify the invention.

Figure 1A:
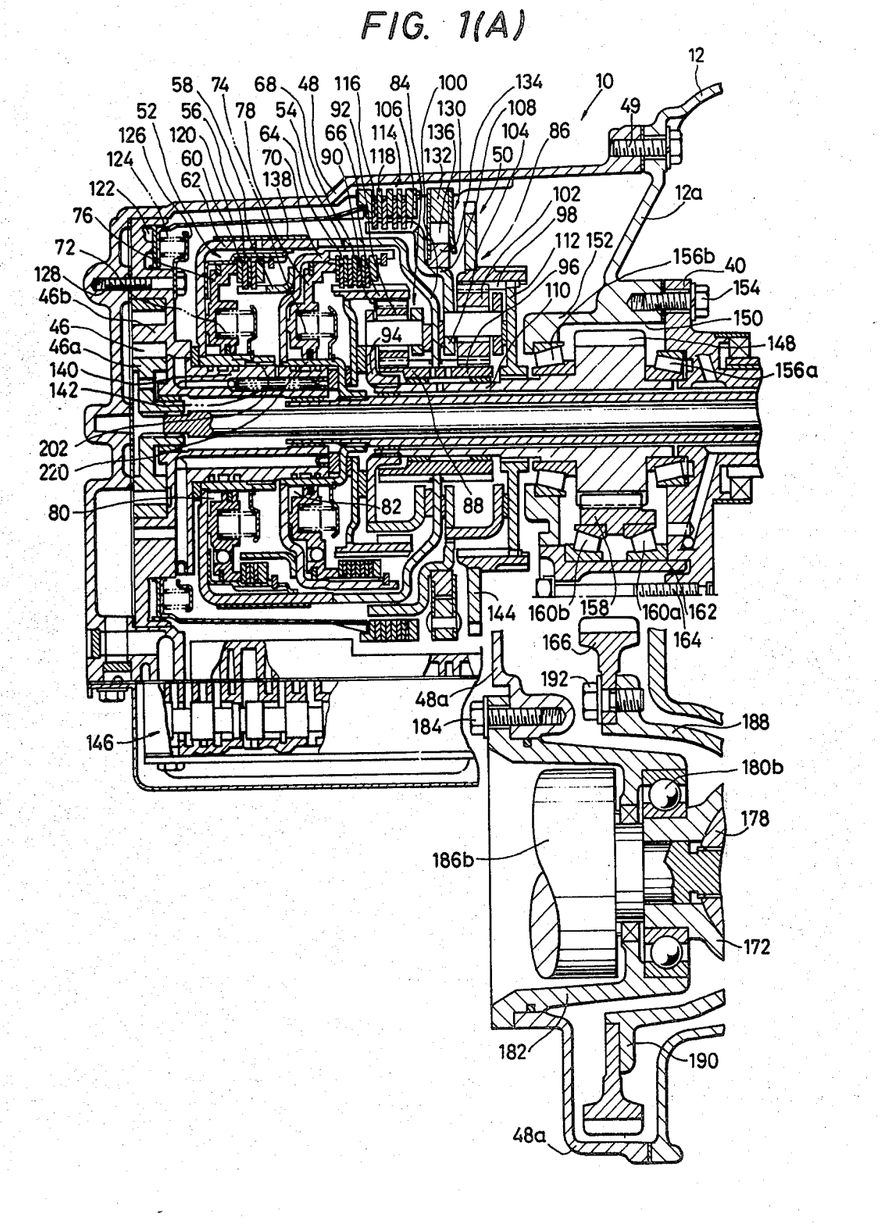
FIGS. 1(A) and 1(B) are sectional views of a transversely mounted type automatic power transmission in combination with a final drive unit, to which an improved clutch mechanism of the invention is applied, the final drive unit being shown moved from its proper position for clearness of the drawing.
Figure 1B:
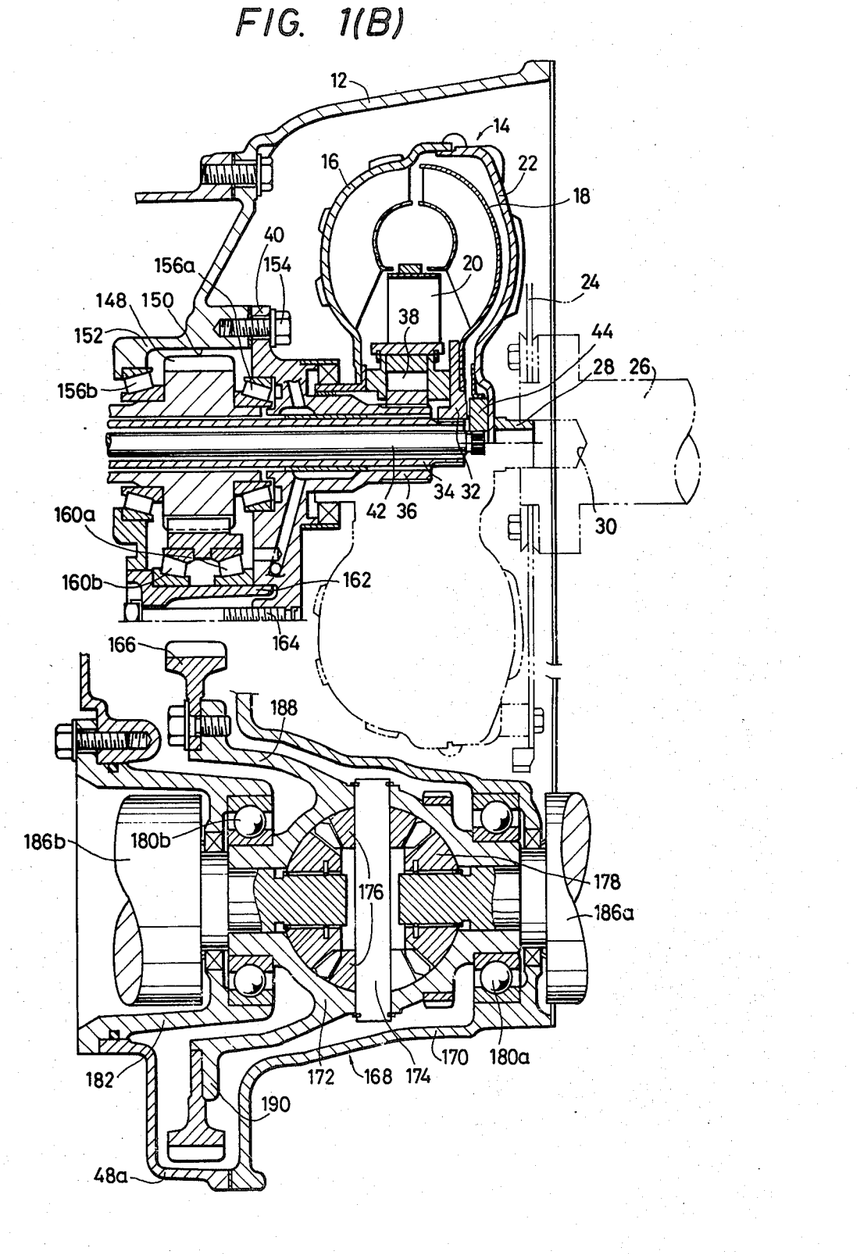

Referring to FIG. 1 of the drawings, there is shown a transversely mounted type automatic power transmission 10 in combination with a final drive unit 168.

The transmission 10 comprises a converter housing 12 within which the torque converter assembly 14 is housed. The torque converter assembly 14 comprises a pump impeller 16, a turbine runner 18, and a stator 20 as is well known in the art. The pump impeller 16 is connected via a converter cover 22 and a drive plate 24 to a crankshaft 26 of a power plant such as an internal combustion engine (not shown) and is rotatable with crankshaft 26 about an axis which is aligned with the axis of rotation of the crankshaft 26. Denoted by 28 is a pilot element which is secured to a central portion of the converter cover 22 and is received in a central bore 30 of the crankshaft 26, as shown. The turbine runner 18 is mounted on a hub 32 which in turn is keyed or splined to a transmission hollow input shaft 34 which has a center axis aligned with the axis of rotation of the engine crankshaft 26. The stator 20 is positioned between the pump impeller 16 and the turbine runner 18 and is mounted on a stator support hollow shaft 36 through a torque converter one-way clutch assembly 38. The stator support hollow shaft 36 has the transmission hollow input shaft 34 axially passed therethrough in substantially coaxial relationship and is fixedly but detachably connected through a flange portion 40 thereof to a base wall 12a of the converter housing 12, as will be well understood hereinlater. The stator 20 is permitted to rotate about the center axis of the input shaft 34 in the same direction as the direction of the pump impeller 16 and accordingly as the direction of rotation of the engine crankshaft 26. An oil pump driving shaft 42 is rotatably and concentrically received in the input shaft 34 and has a right end to which a hub 44 of the converter cover 22 is splined or keyed. As will be understood hereinlater, a left end of the oil pump driving shaft 42 is keyed with a drive gear 46a of a transmission oil pump assembly 46 which has an oil pump boby 46b bolted or otherwise secured to a stationary wall structure of a later-mentioned gear unit housing 48 of the transmission 10.

When the engine is in operation, the driving power produced by the engine is delivered from the engine crankshaft 26 to the pump impeller 16 through the converter cover 22 and is transmitted from the pump impeller 16 to the input shaft 34 through the turbine runner 18 with a torque multiplied by means of the stator 20 at a ratio which is variable with the ratio between the revolution speed of the engine crankshaft 26 and that of the input shaft 34. The pump impeller 16 thus drives not only the turbine runner 18 but also the transmission oil pump assembly 46 through the oil pump driving shaft 42 so that the oil pump assembly 46 delivers oil under pressure which is also variable with the revolution speed of the crankshaft 26 of the engine.

Within the gear unit casing 48 connected via bolts 49 to the converter housing 12 is positioned a gear unit 50 of the transmission 10. The unit 50 herein shown is arranged between the torque converter assembly 14 and the oil pump assembly 46. The gear unit 50 comprises first and second or high-and-reverse and forward drive clutches 52 and 54 which are positioned in a manner that the high-and-reverse clutch 52 is located between the oil pump assembly 46 and the forward drive clutch 54. The high-and-reverse clutch 52 comprises a plurality of plates 56 keyed or splined at their inner peripheral edges to a clutch hub 58 and plates 60 keyed or splined at their outer peripheral edges to a first clutch drum assembly 62. Likewise, the forward drive clutch 54 comprises a plurality of plates 64 keyed or splined at their inner peripheral edges to a clutch hub 66 and plates 68 keyed or splined at their outer peripheral edges to a second clutch drum 70. The clutch hub 58 for the high-and-reverse clutch 52 and the second clutch drum 70 for the forward drive clutch 54 are secured to each other and rotatable with the input shaft 34 with the second clutch drum 70 keyed or splined at its inner peripheral portion to a left end portion of the input shaft 34. The plate 56 of the high-and-reverse clutch 52 and the plates 68 of the forward drive clutch 54 thus serve as driving friction elements and, accordingly, the plates 60 of the high-and-reverse clutch 52 and the plates 64 of the forward drive clutch 54 serve as driven friction elements in the clutches 52 and 54, respectively. Clutch pistons 76 and 78 are respectively incorporated with the high-and-reverse clutch 52 and the forward drive clutch 54 respectively for bringing the clutches 52 and 54 into engagement when moved by a fluid fed into respective fluid chambers 80 and 82 which are formed between the clutch piston 76 and the first clutch drum assembly 62 and between the clutch piston 78 and the second clutch drum 70, respectively, as shown. Return springs 72 and 74 are respectively incorporated with the high-and-reverse clutch 52 and the forward drive clutch 54 to urge the pistons 76 and 78 in a direction to disengage the clutches 52 and 54, respectively.

The gear unit 50 further comprises first and second planetary gear assemblies 84 and 86 which are arranged at the right of the forward drive clutch 54 in the drawing. The first planetary gear assembly 84 comprises an externally toothed sun gear 88 and an internally toothed ring gear 90 which have a common axis of rotation aligned with the center axis of the input shaft 34. The ring gear 90 is formed on the clutch hub 66 for the forward drive clutch 54. The first planetary gear assembly 84 further comprises at least two planet pinions 92 each of which is in mesh with the sun and ring gears 88 and 90 and is rotatable about an axis around the common axis of rotation of the sun and ring gears 88 and 90. The planet pinions 92 of the first planetary gear assembly 84 are journaled on shafts of a pinion carrier 94. The second planetary gear assembly 86 is constructed similarly to the first planetary gear assembly 84 and thus comprises an externally toothed sun gear 96 and an internally toothed ring gear 98 which have a common axis of rotation aligned with the center axis of the transmission hollow input shaft 34. The sun gear 96 is integral with the sun gear 88 of the first planetary gear assembly 84. The united sun gears 88 and 96 of the first and second planetary gear assemblies 84 and 86, respectively, are jointly splined to a connecting shell 100 which encloses the forward drive clutch 54 and the first planetary gear assembly 84 and is securely connected to the first clutch drum assembly 62 for the high-and-reverse clutch 52. The second planetary gear assembly 86 further comprises at least two planet pinions 102 each of which is in mesh with the sun and ring gears 96 and 98 and is rotatable about an axis around the common axis of rotation of the sun and ring gears 96 and 98. The planet pinions 102 of the second planetary gear assembly 86 are rotatably supported by a pinion carrier 104 having a drum portion 106 which leftwardly extends to enclose in part the connecting shell 100 therein, as shown. By the reason which will become clear from the latter, the drum portion 106 of the pinion carrier 104 has a circular step portion 108. The respective sun gears 88 and 96 of the first and second planetary gear assemblies 84 and 86 are formed with center bores through which a transmission hollow output shaft 110 having a center axis aligned with the center axis of the input shaft 34 is passed and axially extends toward the torque converter assembly 14. The output shaft 110 thus coaxially receives therein the input shaft 34, as shown. The output shaft 110 has a left end to which the pinion carrier 94 for the first planetary gear assembly 84 is splined at its inner peripheral edge and has an intermediate portion to which the ring gear 98 for the second planetary gear assembly 86 is connected through a generally disc shaped connecting member 112 which is keyed or splined at its inner peripheral edge to the intermediate portion of the output shaft 110 and at its outer peripheral edge to the ring gear 98. Concentrically mounted around the drum portion 106 of the pinion carrier 104 for the second planetary gear assembly 86 is a low-and-reverse brake 114. This brake 114 comprises a plurality of plates 116 keyed or splined at their inner peripheral edges to the drum portion 106 of the second planetary gear assembly 86, and a plurality of plates 118 which are keyed or splined at their outer peripheral edges to an intermediate portion of the inner wall of the gear unit housing 48. The low-and-reverse brake 114 further has a drum shaped piston 120 which is concentrically mounted around the first clutch drum assembly 62 for the high-and-reverse clutch 52 and engages at its right end to the leftmost member of the plates 116 and 118. The left end portion of the piston 120 is sealingly disposed in a fluid chamber 122 into which a fluid under pressure is fed to move the piston 120 rightwardly urging the plates 116 and 118 of the brake unit 114 to be engaged with one another against a biasing force developed by return springs 124 which are interposed between the left end portion of the piston 120 and a spring retainer 126 fixed to the oil pump body 46b via bolts 128. As shown, the fluid chamber 122 is formed in the oil pump body 46b. The low-and-reverse brake 114 is paralleled in effect by a transmission one-way clutch 130 which is positioned around the before-mentioned drum portion 106 for the second planetary gear assembly 86 and comprises a stationary outer race member 132, a rotatable inner race member 134 and a series of spring loaded rollers 136 disposed between the outer and inner race members 132 and 134. The stationary outer race member 132 is splined to the inner wall of the gear unit housing 48. On the other hand, the rotatable inner race member 134 is securely disposed on the before-mentioned circular step portion 108 of the drum portion 106 for the second planetary gear assembly 86. The rollers 136 are arranged in a manner to be caused to stick to the outer and inner race members 132 and 134 and thereby lock up the rotatable inner race member 134 to the stationary outer race member 132 when the inner race member 134 is urged to turn about the center axis of the output shaft 110 in a direction opposite to the direction of rotation of the engine crankshaft 26, viz., to the direction of rotation of the output shaft 110 to produce a forward drive mode of an automotive vehicle. The gear unit 50 of the transmission 10 further comprises a brake band 138 which wrappes the cylindrical outer surface of the first clutch drum assembly 62 for the high-and-reverse clutch 52. Although not shown, the brake band 138 is anchored at one end to the gear unit housing 48 and is at the other end connected to or engaged by a fluid operated band servo unit (not shown). Although, not shown in the drawing, a transmission governor assembly indirectly driven by the output shaft 110 is arranged in the gear unit housing 48 in the vicinity of the ring gear 98 of the second planetary gear assembly 86. The body 46b of the before-mentioned oil pump assembly 46 has a rightwardly extending sleeve portion 140 in which a fluid passage 142 for lubrication fluid for the clutch assemblies 52 and 54 is formed. Indicated by numeral 144 is a parking gear which is secured on the ring gear 98 for the second planetary gear assembly 86, forming part of a parking lock assembly to lock the output shaft 110 by the aid of a parking pawl (not shown) meshing with the parking gear 144 during parking of the vehicle. Indicated generally by numeral 146 is a hydraulic control valve unit by which the gear unit 50 is controlled.

The output shaft 110 is integrally formed at its right section with an output gear 148 which has an axis of rotation aligned with the center axis of the output shaft 110. As will be understood from the drawing, the output gear 148 is situated within a chamber 150 which is defined by not only an extension 152 of the base wall 12a of the cover housing 12 but also the flange portion 40 of the stator support hollow shaft 36. The flange portion 40 is detachably connected to the base wall 12a by means of bolts 154. As shown, the extension 152 protrudes into the interior of the gear unit housing 48 and has at its leading end portion a bearing opening (no numeral) within which is situated a tapered roller bearing 156b. The flange portion 40 of the stator support hollow shaft 36 is formed at a portion exposed to the chamber 150 of the output gear 148 with a blind bore or bearing opening (no numeral) within which is situated another tapered roller bearing 156a. Inner races of these bearings 156a and 156b are mounted on the transmission output shaft 110 in a manner to put the output gear 148 therebetween. Meshing with the output gear 148 is an idler gear 158 which is supported by a pair of tapered roller bearings 160a and 160b. Inner races of these bearings 160a and 160b are coaxially mounted on a sleeve shaft 162 which is connected to the flange portion 40 of the before-mentioned stator support hollow shaft 36 by means of a bolt 164 passing through the sleeve shaft 162 in a manner that the axis of the idler gear 158 is parallel with the axis of the output gear 148. The idler gear 158 is meshed with an externally toothed ring gear 166 forming part of the final drive unit 168.

The final drive unit 168 is positioned on a lateral side of the transmission 10 and comprises a housing 170 integral with the converter housing 12 and housing therein a differential case 172, a differential pinion shaft 174 passing through the case 172, differential pinions 176 rotatably disposed about the pinion shaft 174, and differential side gears 178 each meshing with both the differential pinions 176 as is known in the art. The case 172 has both lateral end portions on which differential side bearings 180a and 180b are mounted. The right hand bearing 180a is securely received in the bore of the housing 170, while the lefthand bearing 180b is received in a drum-shaped retainer 182 which is detachably held in an opening (no numeral) formed in a laterally projected portion 48a of the gear unit housing 48. Denoted by numeral 184 is a bolt for connecting the retainer 182 to the portion 48a of the gear unit housing 48. Extending away from the differential side gears 178 are respective axle shafts 186a and 186b. The case 172 is integrally formed with a connecting shell portion 188 which extends leftwardly in this drawing and spacedly encloses in part the drum-shaped retainer 182. The connecting shell portion 188 has at the leading end thereof a flange 190 to which the above-mentioned externally toothed ring gear 166 is fixed by means of bolts 192.

With this, the power train between the internal combustion engine and the driving road wheels connected to the axle shaft 186a and 186b is made up.

The transmission 10 incorporating with the final drive unit 168 operates as follows:

TABLE 1

| | | Clutches | | | | Brake band (138) | |
|---|---|---|---|---|---|---|---|
| Range | | High-and-Reverse (52) | Forward drive (54) | Low & reverse brake (114) | One way clutch (130) | Applied | Released |
| | "P" | | | 0 | | | |
| | "R" | 0 | | 0 | | | 0 |
| | "N" | | | | | | |
| Drive | "D₁" | | 0 | | 0 | | |
| | "D₂" | | 0 | | | 0 | |
| | "D₃" | 0 | 0 | | | (0) | 0 |
| | "2" | | 0 | | | 0 | |
| "1" | 2 | | 0 | | | 0 | |
| | 1 | | 0 | 0 | | | |

The high-and-reverse and forward drive clutches 52 and 54, low-and-reverse brake 114, one-way clutch 130 and brake band 138 of the transmission mechanism or the gear unit 50 having the construction hereinbefore described are operated in accordance with shedules indicated in Table 1.

In Table 1, the sign "O" indicates that for each of the high-and-reverse, forward-drive and one-way clutches 52, 54 and 130 the clutch in question is in a coupled condition and for the low-and-reverse brake 114 the brake is in a condition applied. As to the brake band 138, the sign "O" in the column under "Applied" indicates that the brake band 138 is actuated to lock up the first clutch drum assembly 62 and the sign "O" in the column under "Released" indicates that the brake band 138 is released from the first clutch drum assembly 62. The sign "O" enclosed in the parentheses means that there is a fluid pressure developed in the brake-apply chamber of the servo unit (not shown) but the brake band 138 is released from the first clutch drum assembly 62 with a fluid pressure also developed in the brake-release chamber of the servo unit.

The parking, reverse drive and neutral gear ranges and the automatic forward drive and manual second and first forward drive ranges as indicated in the left-most column of Table are selectively established in transmission mechanism by manipulating a manual selector lever (not shown) which has positioned "P", "R", "N", "D", "2" and "1" respectively corresponding to the above-mentioned gear ranges.

When now the selector lever is in the parking range "P" or the neutral range "N", both of the high-and-reverse and forward drive clutches 52 and 54 are held in the uncoupled condition thereof so that the driving connection between the input and output shafts 34 and 110 is interrupted and as a consequence the output shaft 110 is maintained at rest even though the engine is in operation delivering its power output from the crankshaft 26. Under these conditions, either the parking range or the neutral range is established in the transmission mechanism depending upon whether the selector lever is held in the parking range "P" or in the neutral range "N". If the selector lever is in the parking range "P", the low-and-reverse brake 114 is held in the condition applied so that the drum portion 106 and accordingly the pinion carrier 104 of the second planetary gear assembly 86 are locked to the gear unit housing 48. During parking of the vehicle, the parking gear 144 mounted on the ring gear 98 for the second planetary gear assembly 86 is captured by the parking pawl (not shown) of the before-mentioned parking lock assembly so that the output shaft 110 is locked up to the gear unit housing 48.

When the manual selector lever is moved into the automatic forward drive range "D" with the engine operating, the forward drive clutch 54 is caused to couple. The power output delivered from the crankshaft 26 of the engine to the input shaft 34 through the torque converter assembly 14 is transmitted through the forward drive clutch 54 and the clutch hub 66 to the ring gear 90 of the first planetary gear assembly 84. The ring gear 90 is driven to rotate in the forward direction about the center axis of the output shaft 110 and thereby causes the sun gear 88 to rotate in the opposite direction about the center axis of the output shaft 110 through the planet pinions 92 each of which is rotated in the same direction as the ring gear 90 about its own axis of rotation. The sun gear 96 of the second planetary gear assembly 86, which is integral with the sun gear 88 of the first planetary gear assembly 84, is rotated in the opposite or reverse direction about the center axis of the output shaft 110 and causes the ring gear 98 of the second planetary gear assembly 86 to turn in the forward direction about the center axis of the output shaft 110. Under these conditions, the individual planet pinions 102 of the second planetary gear assembly 86 are caused to rotate in the forward direction about the respective axes of rotation thereof and therefore attempt to turn in the reverse direction about the center axis of the output shaft 110. The revolution of the pinion carrier 104 of the second planetary gear assembly 86 is, however, prohibited by the one-way clutch 130 connected to the pinion carrier 104, more specifically to the step portion 108 of the drum portion 106 with the result that the pinion carrier 104 is locked to the gear unit housing 48 and acts as reaction elements for the ring gear 98 which drives via the disc-shaped connecting member 112 the output shaft 110 to rotate in the forward direction about the center axis thereof. The output shaft 110 is connected to the pinion carrier 94 of the first planetary gear assembly 84 so that each of the planet pinions 92 is rotated about the center axis of the output shaft 110 in the same direction as the direction of rotation of the ring gear 90 of the first planetary gear assembly 84 but at a revolution speed which is lower with a certain ratio than the revolution speed of the ring gear 90 on which the planet pinions 92 are rolling, thereby creating the first forward speed or "low" gear ratio ($D_1$) in the transmission mechanism.

If the vehicle is thereafter sped up and the vehicle speed reaches a certain level, the band servo unit for the brake band 138 is actuated by a fluid distributed into the brake-apply fluid chamber of the servo unit and causes the brake band 138 to be tightened on the first clutch drum assembly 62 which is connected via the connecting shell 100 to the integral first and second sun gears 88 and 96 for the first and second planetary gear assemblies 84 and 86. The sun gear 88 of the first planetary gear assembly 84 now acts as a reaction element for the planet pinions 92 which are being driven to turn in the forward direction about the center axis of the output shaft 110 by the ring gear 90 rotating with the input shaft 34 through the forward drive clutch 54 which is kept coupled. The driving torque carried over to the ring gear 90 of the first planetary gear assembly 84 through the forward drive clutch 54 is therefore transmitted to the output shaft 110 by means of the planet pinions 92 and the associated pinion carrier 94. Under these conditions, the individual planet pinions 92 of the first planetary gear assembly 84 are caused to rotate in the forward direction about the respective axis of rotation thereof and thus roll on the ring gear 90 while rotating in the forward direction about the center axis of the output shaft 110. The output shaft 110 is thus rotated in the forward direction about the center axis thereof at a speed higher than that achieved under the first forward speed or "low" gear ratio ($D_1$) but lower with a certain ratio than the revolution speed of the ring gear 90 of the first planetary gear assembly 84, thereby producing the second forward speed or intermediate ratio ($D_2$) in the transmission mechanism. Under the second forward speed thus established, the output shaft 110 drives the ring gear 98 of the second planetary gear assembly 86 to rotate in the forward direction about the center axis of the output shaft 110 and thereby causes the planet pinions 102 to turn about the center axis of the output shaft 110 in the same direction as the direction of rotation of the ring gear 98. Thus, the pinion carrier 104 of the second planetary gear assembly 86 and accordingly the drum portion 106 are also rotated in the forward direction about the center axis of the output shaft 110 and cause the inner race member 134 of the transmission one-way clutch 103 to run idle within the outer race member 132 of the one-way clutch 130.

As the vehicle speed further increases, a fluid is distributed into the brake-release fluid chamber of the band servo unit for the brake band 138 and causes the brake band 138 to be released from the first clutch drum assembly 62 and, substantially at the same time, the high-and-reverse clutch 52 is actuated to couple. The power output delivered from the crankshaft 26 of the engine to the input shaft 34 is now transmitted on one hand to the integral first and second sun gears 88 and 96 of the first and second planetary gear assemblies 84 and 86 through the high-and-reverse clutch 52 and the first clutch drum assembly 62 released from the brake band 138 and on the other hand to the ring gear 90 of the first planetary gear assembly 84 by way of the forward drive clutch 54 and the clutch hub 66. It therefore follows that the sun gear 88 and the ring gear 90 for the first planetary gear assembly 84 are locked up so that the sun and ring gears 88 and 90 and the planet pinions 92 therebetween as well as the output shaft 110 connected to the planet pinion 92 by the pinion carrier 94 are driven to rotate as a single unit in the forward direction about the center axis of the output shaft 110. The output shaft 110 is thus rotated in the forward direction about the center axis thereof at a speed substantially equal to the revolution speed of the input shaft 34, thereby providing the third forward speed or "high" gear ratio ($D_3$) in the transmission mechanism. Under the third forward drive speed thus established, the input shaft 34 driven by the turbine runner 18 of the torque converter 14 is rotated at a speed substantially equal to the revolution speed of the engine crankshaft 26 driving the pump impeller 16 of the converter 14 and, as a consequence, there occurs no torque multiplication by the torque converter 14, which thus functions merely as a fluid coupling.

When the manual selector lever is moved into the reverse drive range "R". The high-and-reverse clutch 52 and the low-and-reverse brake 114 are actuated in the transmission mechanism. With the high-and-reverse clutch 52 thus engaged, the power output delivered from the crankshaft 26 of the engine to the input shaft 34 by way of the torque converter 14 is transmitted through the high-and-reverse clutch 52, first clutch drum assembly 62 and connecting shell 100 to the integral sun gears 88 and 96 of the first and second planetary gear assemblies 84 and 86, respectively, causing the sun gears 88 and 96 to rotate in the forward direction about the center axis of the output shaft 110. The low-and-reverse brake 114 is being actuated to lock the drum portion 106 and thus the pinion carrier 104 for the second planetary gear assembly 86 is held stationary with respect to the gear unit housing 48, with the result that the planet pinions 102 of the second planetary gear assembly 86 are driven by the sun gear 96 for rotation in the reverse direction about the center axis of the output shaft 110. This causes the output shaft 110 to rotate in the reverse direction about the center axis thereof at a speed which is lower with a certain ratio than the revolution speed of the sun gears 88 and 96 of the first and second planetary gear assemblies 84 and 86 and accordingly of the input shaft 34, establishing the reverse drive range "R" in the transmission mechanism.

When the selector lever is in the manual second forward drive range "2", the forward drive clutch 54 and the brake band 138 are actuated and, as a consequence the output shaft 110 is driven to rotate in the forward direction about the center axis thereof by means of the pinion carrier 94 of the first planetary gear assembly 84 as in the second forward speed ($D_2$) produced with the selector lever held in the automatic forward drive range "D".

Under the condition in which the selector lever is held in the manual first forward drive range position "1", either the low-and-reverse brake 114 or the brake band 138 as well as the forward drive clutch 54 is actuated to lock the pinion carrier 104 of the second planetary gear assembly 86 or the integral sun gears 88 and 96 of the first and second planetary gear assemblies 84 and 86 depending upon the vehicle speed. If the forward drive clutch 54 and the brake band 138 are actuated in this instance, the output shaft 110 is driven to rotate in the forward direction by the pinion carrier 94 of the first planetary gear assembly 84 as in the second forward speed ($D_2$) established with the selector lever held in the automatic forward drive range "D". If, on the other hand, the forward drive clutch 54 and the low-and-reverse brake 114 are actuated in the manual forward speed range, the output shaft 110 is driven to rotate in the forward direction about the center axis thereof by the ring gear 98 of the second planetary gear assembly 86 having the pinion carrier 104 held stationary with respect to the gear unit housing 48, as in the first forward speed ($D_1$) produced with the selector lever held in the automatic forward drive range "D". While the pinion carrier 104 is locked to the gear unit housing 48 by the action of the transmission one-way clutch 130 under the first forward speed produced in the automatic forward drive range, the pinion carrier 104 is locked to the gear unit housing 48 by means of the low-and-reverse brake 114 under the first forward speed produced in the manual first forward drive range. During the first forward speed in the manual first forward drive range, therefore a driving torque can be transmitted backwardly from the ring gear 98 to the sun gear 96 through the planet pinions 102 in the second planetary gear assembly 86 and, for this reason, the engine brake can be obtained.

The following description is directed to the detail in construction of the high-and-reverse clutch 52 and the forward drive clutch 54 to which the present invention is directly applied.

Figure 2:
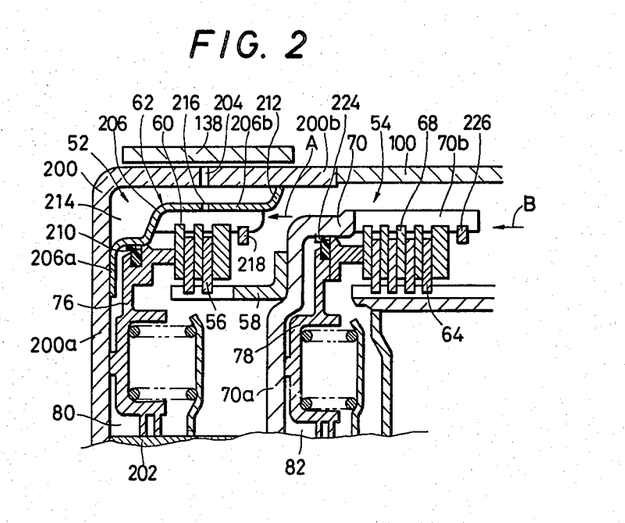
FIG. 2 is a fragmentary view, but on an enlarged scale, of a portion of the transmission shown in FIG. 1, showing the detail of the clutch mechanism of the invention.

Referring to FIG. 2, there is partially shown, but on an enlarged scale, the high-and-reverse clutch 52, the forward drive clutch 54 and their cooperating parts. The clutch drum assembly 62 (which has been referred to as "first clutch drum assembly" hereinbefore) of the high-and-reverse clutch 52 comprises a drum member 200 and a cylindrical member 206 which are both constructed of sheet metal. The drum member 200 is firmly mounted at its circular base portion 200a on a sleeve 202 which is sealingly and rotatably disposed about the sleeve portion 140 of the oil pump body 46b so that the drum member 200 and the sleeve 202 are rotatable about the sleeve portion 140 as a single unit. The cylindrical side portion 200b of the drum member 200 is formed with holes 204 through which a lubricant oil is forced to pass for lubrication between contact surfaces of the brake band 138 and the drum member 200. The cylindrical member 206 is coaxially disposed within the drum member 200 with its circular base portion 206a welded to the inside surface of the circular base portion 200a of the drum member 200 by electron beam wlelding technique. The cylindrical side portion 206b of the cylindrical member 206 has a small diameter section (no numeral) which defines therewithin the fluid chamber 80 for the piston 76, and a large diameter section (no numeral) which is entirely corrugated to have longitudinally extending grooves or spline portions 208 therearound, as is understood from FIG. 3. The clutch plates 60 hereinbefore-mentioned are splined to these grooves 208 to be movable longitudinally with respect to the cylindrical member 206. Designated by numeral 210 is a sealing member disposed between the piston 76 and the small diameter section of the cylindrical member 206. The large diameter section of the cylindrical member 206 is formed at its open end with a radially outwardly projecting circular ridge 212. As shown, the circular ridge 212 is entirely in contact with the inner surface of the cylindrical side portion 200b of the drum member 200 so that an enclosed chamber 214 is defined by the drum member 200 and the cylindrical member 206. The corrugated side portion 206b is formed with holes 216 so that upon rotation of the unit of the drum member 200 and the cylindrical member 206, a lubricant oil in the interior of the cylindrical member 206 is forced to enter into the chamber 214 through the holes 216 by the centrifugal force thus exerted, following that the oil thus gathered in the chamber 214 is forced to enter through the holes 204 into the clearance between the brake band 138 and the drum member 200 for lubrication therebetween. Denoted by numeral 218 is a snap ring secured to the cylindrical member 206 for limiting the rightward movement of the clutch plates 56 and 60.

The clutch drum 70 (which has been referred to as to "second clutch Drum" hereinbefore) of the forward drive clutch 54 is constructed of sheet metal and comprises a circular base portion 70a and a cylindrical side portion 70b. The circular base portion 70a is firmly mounted on a connection drum 220 which is sealingly and rotatably disposed about the sleeve portion 140 of the oil pump body 46b. The connection drum 220 is splined at its reduced end to the input shaft 34, as is shown in FIG. 1, so that the clutch drum 70, the connection drum 220 and the input shaft 34 are rotatable about a common axis as a single unit. The cylindrical side portion 70b of the clutch drum 70 has a small diameter section (no numeral) which defines therewithin the fluid chamber 82 for the piston 78, and a large diameter section (no numeral) which is formed with a plurality of longitudinally extending openings 222 therearound, as will be understood from FIG. 4. The clutch plates 68 are splined to these openings 222, in a manner as will be explained hereinafter, so that the plates 68 are longitudinally movable with respect to the cylindrical side portion 70b. Designated by numeral 224 is a sealing member disposed between the piston 78 and the small diameter section of the cylindrical side portion 70b. A snap ring 226 is secured to the cylindrical side portion 70b to limit the rightward movements of the plates 68 and 64.

The clutch plates 60 and 68 for the high-and-reverse and forward drive clutches 52 and 54 have on their peripheries several groups of radially outwardly projected trapezoidal detents or teeth 228 which are splined to or received into the grooves 208 of the cylindrical member 206 for the high-and-reverse clutch 52 and to the openings 222 of the clutch drum 70 for the forward drive clutch 54 in a manner as will be explained therein next.

According to the present invention, the following several measures are adopted to the construction of the grooves 208, the openings 222 and the clutch plates 60 and 68 so that these clutches 52 and 54 can use common clutch plates.

Figure 4:
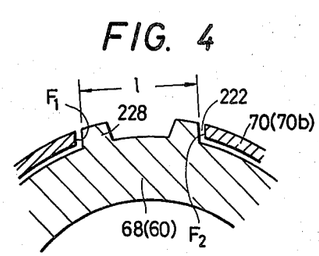
FIG. 4 is a fragmentary sectional view taken in the direction of B of FIG. 2, several parts being not shown for clearness.
Figure 5:
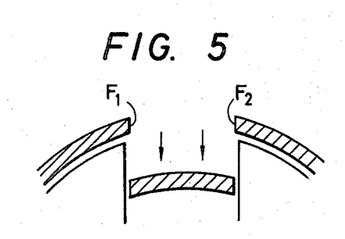
FIG. 5 is a view depicting procedure of punching applied to the clutch drum of the forward drive clutch.

First, each of the openings 222 of the clutch drum 70 for the forward drive clutch 54 is formed and sized to receive therein at least two adjacent teeth 228 of each of the common plates 60 and 68, as will be understood from FIG. 4.

Figure 3:
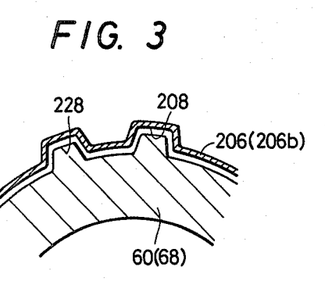
FIG. 3 is a fragmentary sectional view taken in the direction of the arrow A of FIG. 2, several parts being not shown for clearness of important portions.

Second, each of the grooves 208 of the cylindrical member 206 for the high-and-reverse clutch 52 is shaped trapezoidal in conformance with the trapezoidal teeth 228 of the common plates 60 and 68, as will be understood from FIG. 3. It should be noted that such grooves 208 are inevitably provided by conventional press forming technique, as is known in the art.

Third, the teeth 228 on the common plates 60 and 68 are constructed to satisfy the next relation:

$$(N-1) \cdot \alpha = 2 \cdot \beta \tag{1}$$

where:
N—number of teeth 228 received in each opening 222,
α—pitch angle established between any adjacent two of teeth 228 received in each opening 222, and
β—angle of obliquity of each tooth 228.

Figure 6:
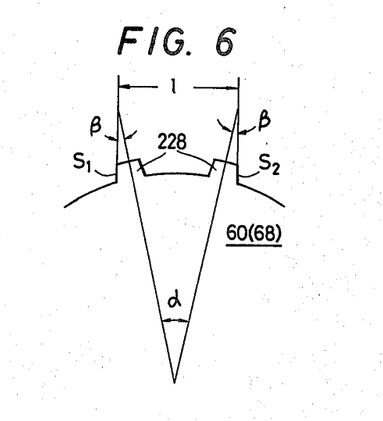
FIGS. 6 and 7 are diagrammatic illustrations depicting the method of determining the geometry of teeth formed on the clutch plate.
Figure 7:
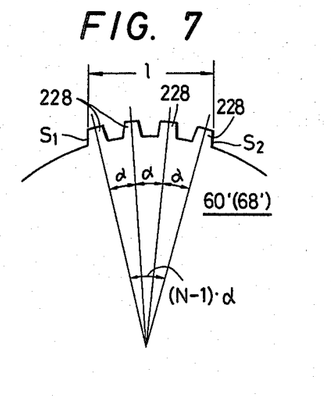

With this relation (1), it will be appreciated that respective outer sides $S_1$ and $S_2$ of two teeth 228 which are to be located at the outermost positions in each opening 222 of the clutch drum 70 for the forward drive clutch 54 are parallel with each other, as will be seen from FIGS. 6 and 7.

Fourth, two facing edge surfaces $F_1$ and $F_2$ of each opening 222 are parallel with each other and the width of the opening 222 is substantially equal to the distance between the outer sides $S_1$ and $S_2$ of the two teeth 228 mentioned above. It should be noted that such paralleled shared surfaces $F_1$ and $F_2$ are inevitably provided when the openings 222 are formed by conventional punching.

Fifth, if desired the teeth 228 may be formed into involute teeth instead of the trapezoidal teeth. In such case, the grooves 208 of the cylindrical member 206 are formed also involute in conformance with the shape of the involute teeth of the plates 60 and 68. Although in this case, the parallel relation is not established between the respective outer sides $S_1$ and $S_2$ of the two teeth 228, experience has proved that adequate spline connection between the clutch plates and the clutch drum 70 for the forward drive clutch is achieved.

With these, it will be appreciated that the high-and-reverse clutch 52 and the forward drive clutch 54 according to the invention can use common clutch plates, inducing simple assemblage of the clutches 52 and 54 and thus reduction of cost of the transmission.

What is claimed is:

1. In a power transmission having: a first clutch including a first drum, a cylindrical member coaxially disposed within and secured to said first drum to be rotatable therewith and having therearound a plurality of grooves extending in parallel with the axis of said cylindrical member, and a plurality of first clutch plates each having on the periphery thereof radially outwardly projecting teeth which are splined to said grooves so that said first clutch plates are axially movable with respect to said cylindrical member; and a second clutch including a second drum having therearound a plurality of elongate through openings extending in parallel with the axis of said second drum, and a plurality of second clutch plates each having on the periphery thereof radially outwardly projecting teeth which are splined to said openings so that said second clutch plates are axially movable with respect to said second drum, the improvement comprising: said first and second clutch plates being identical in construction; said grooves being dimensioned to coact with individual teeth splined thereto; and, said openings being dimensioned to coact with multiple teeth splined thereto.

2. The improvement as claimed in claim 1 wherein the teeth of the first and second clutch plates are constructed to satisfy the relation $(N-1)\cdot \alpha = 2\cdot \beta$ wherein N, $\alpha$ and $\beta$ respectively represent the number of teeth received in each of said openings, the pitch angle established between any adjacent two teeth received in each of said openings, and the angle of obliquity of each tooth.

3. The improvement as claimed in claim 2, in which each of said teeth on the first and second clutch plates is provided with a trapezoidal cross section, further in which respective outer sides of two teeth which are to be located at the outermost positions in each opening of said second drum are parallel to each other.

4. The improvement as claimed in claim 3, in which said first drum and said cylindrical member of said first clutch and said second drum of said second clutch are constructed of sheet metal, said grooves of said cylindrical member being formed by press forming, and said openings of said second drum being provided by punching.

5. The improvement as claimed in claim 4, in which each of said grooves of said cylindrical member is provided with a trapezoidal shape in conformance with the shape of the teeth of said clutch plates, further in which two facing shared surfaces of each opening of said second drum are parallel to each other.

6. The improvement as claimed in claim 1 wherein the teeth of said clutch plates have non-parallel sides, with adjacent teeth having non-parallel confronting sides and parallel non-confronting sides, said grooves having non-parallel sides adapted to coact with the non-parallel sides of individual teeth splined thereto, and said openings having parallel sides adapted to coact with the parallel non-confronting sides of multiple teeth splined thereto.

* * * * *